United States Patent [19]

Jacobs

[11] Patent Number: 5,186,474
[45] Date of Patent: Feb. 16, 1993

[54] SEAL RING FOR ORIFICE PLATE

[76] Inventor: James L. Jacobs, 2031 Denais, Duson, La. 70529

[21] Appl. No.: 801,750

[22] Filed: Dec. 3, 1991

[51] Int. Cl.⁵ .............................................. F16J 15/00
[52] U.S. Cl. .................................. 277/166; 277/180; 277/189; 138/44
[58] Field of Search ............ 277/136, 137, 166, 167.3, 277/180, 181, 189; 384/48–50, 494, 537; 138/44

[56] References Cited

U.S. PATENT DOCUMENTS

| | | | |
|---|---|---|---|
| 2,407,951 | 9/1947 | Daniel | 138/44 |
| 2,448,071 | 8/1948 | Anderson | 138/44 |
| 4,014,366 | 3/1977 | Critendon | 138/44 |
| 4,125,298 | 11/1978 | Heurich et al. | 384/537 |
| 4,410,010 | 10/1983 | Van Scoy | 138/44 |
| 4,505,523 | 3/1985 | Stephan | 384/494 |
| 4,986,312 | 1/1991 | Gute | 138/44 |
| 5,042,531 | 8/1991 | Foster et al. | 138/44 |
| 5,069,252 | 12/1991 | Kendrick et al. | 138/44 |

OTHER PUBLICATIONS

Daniel Flow Products, Inc., "Orifice Plates and Plate Sealing Units," 1989, p. 5.
Daniel Flow Products, Inc., "API/AGA 14.3 Update;" 1991.

Primary Examiner—William A. Cuchlinski, Jr.
Assistant Examiner—Daniel G. DePumpo
Attorney, Agent, or Firm—Pravel, Gambrell, Hewitt, Kimball & Krieger

[57] ABSTRACT

A seal ring for maintaining the radial position of an orifice plate in a carrier plate having a circular bore extending therethrough, the seal ring including a body having an inner periphery containing an annular recessed groove for receiving the outer periphery of the orifice plate and an outer periphery which is received by the circular bore of the carrier plate. The seal ring further includes a plurality of pins circumferentially spaced around the body wherein each pin is substantially tangent with the outer periphery of the body and also substantially tangent with the annular recessed groove of the body.

7 Claims, 3 Drawing Sheets

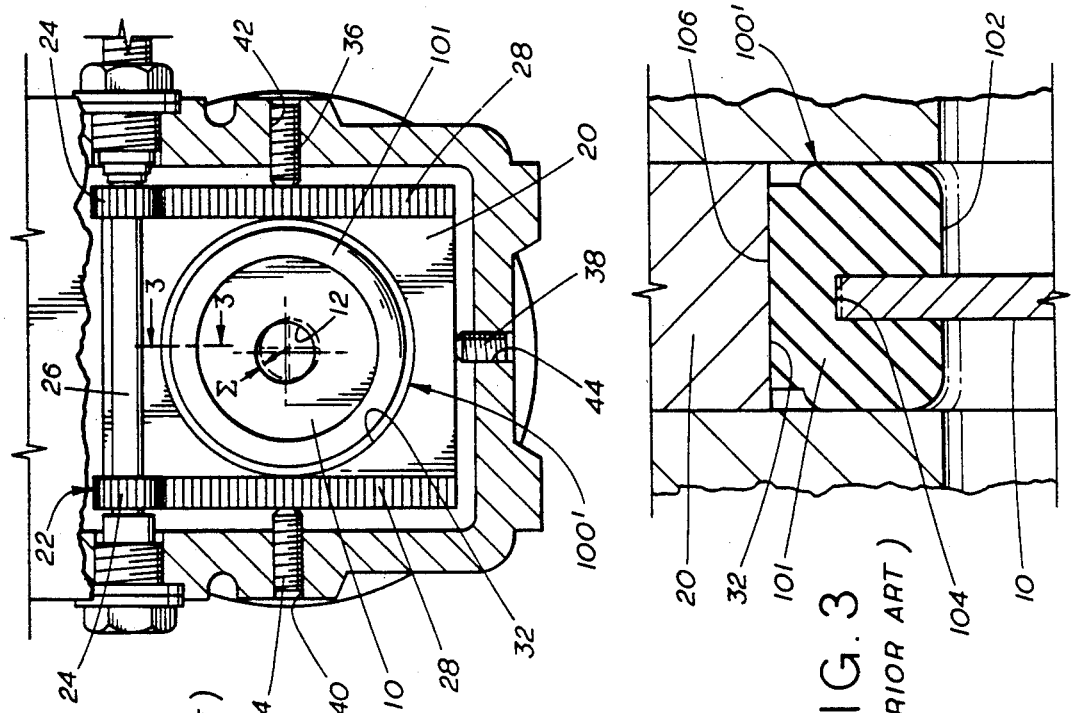
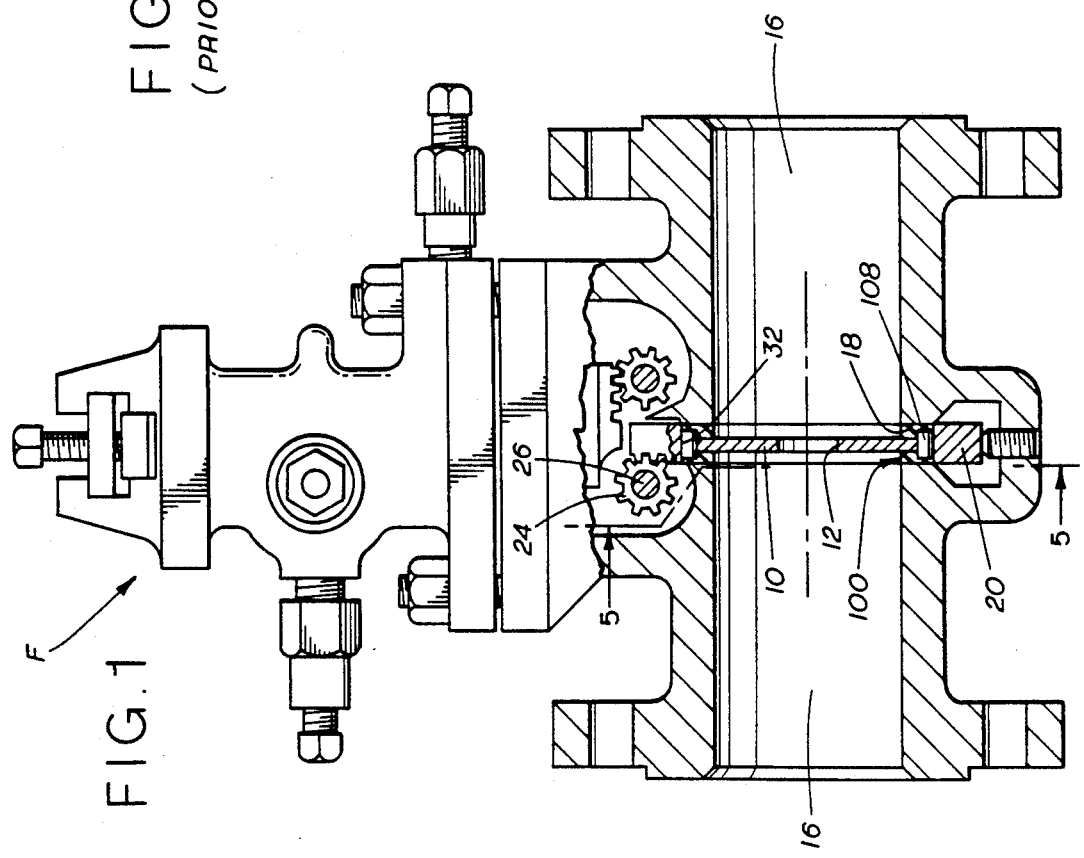

5,186,474

SEAL RING FOR ORIFICE PLATE

BACKGROUND OF THE INVENTION

1. Field of the Invention

The present invention relates to differential pressure flow instruments for determining the rate of flow of a fluid through a pipe and more specifically to orifice fittings.

2. Description of the Prior Art

The predominant measurement in the process industry is flow rate. The need for accuracy in the measurement of fluid flow in the process industry is extremely important. A small error in the measurement of large quantities of a fluid through a pipe translates into a loss of income.

Normally, wherever possible, flow rates are measured with a flat plate orifice which is installed in the pipe carrying the fluid. Oftentimes, the flat plate orifice is housed in an orifice flow meter called an orifice fitting as shown in FIG. 1. The flat plate orifice has a circular bore whose diameter is less than the diameter of the pipe in which it is installed. As Venturi discovered in the late 1700's, fluids gain speed and lose pressure when flowing through a converging section of pipe. Thus, as the fluid converges and accelerates to flow through the smaller bore, it loses pressure. The loss of pressure becomes the differential pressure used to measure the rate of flow.

Many factors affect the accuracy of the readings and the determination of the rate of flow. Standards have been established and adopted by various professional associations. The most popular basis for orifice flow meter design and installation and the accepted standard of orifice flow meter design and installation for the natural gas industry and the process industries in the United States and Canada is the American Gas Association (AGA) publication, Orifice Measurement of Natural Gas, Gas Measurement Committee Report No. 3. The American Petroleum Institute (API) incorporates the AGA publication in its Manual of Petroleum Measurement Standards, Chapter 14—Natural Gas Fluids Measurement. Among the many standards established in these publications is the maximum allowable orifice plate bore eccentricity $\Sigma$. The orifice plate bore must be concentric with both the upstream and downstream inside wall of the orifice plate holder, although the eccentricity with respect to the upstream side is the most critical.

FIG. 1 shows a typical orifice fitting, generally designated as F, representative of a class of orifice holders that is widely used throughout the industry. It is also noted that FIG. 1 also shows the present invention generally designated as 100. Referring to FIG. 1, the bore 12 of the orifice plate 10 must be concentric or within an allowable eccentricity $\Sigma$ with the upstream and downstream inside diameter of the bore of the orifice fitting. The orifice plate is held in place in a carrier plate by a flexible, pliant seal ring. Due to the pressures and temperatures experienced by the orifice plate 10 and the seal ring under operating conditions, the orifice plate 10 may move radially a distance of 0.005 inches to even 0.015 inches, thus possibly exceeding the allowable eccentricity of the orifice plate bore with respect to the bore of the orifice fitting.

It is desirable to have an economical, simple and extremely dependable apparatus for ensuring that the orifice plate bore remains concentric or within the allowable eccentricity in the orifice fitting under operating conditions.

SUMMARY OF THE PRESENT INVENTION

The present invention provides an improved seal ring that is economical, simple, and extremely dependable for ensuring that a properly aligned orifice plate bore in an orifice fitting remains concentric or within the allowable eccentricity under operating conditions. The improved seal ring maintains the radial position of the orifice plate in the carrier plate by providing substantially metal to metal contact between the orifice plate and the carrier plate. The improved seal ring has a flexible, pliant body which includes a plurality of pins positioned in the body of the seal ring in a direction parallel to the bore of the orifice fitting. The seal ring has an inner periphery containing an annular recessed groove for receiving the orifice plate. The seal ring has an outer periphery which engages a carrier plate.

The pins are preferably positioned in the seal ring during the molding of the seal ring body. In the preferred embodiment, the pins are positioned in the seal ring body such that each pin is substantially tangent with the outer periphery of the seal ring and substantially tangent with the recessed groove. The pins have a sufficient diameter to ensure that the orifice plate bore is maintained within the allowable eccentricity under operating conditions.

BRIEF DESCRIPTION OF THE DRAWINGS

In order to more fully understand the drawings referred to in the detailed description of the present invention, a brief description of each drawing is presented, in which:

FIG. 1 is a partial sectional view of a typical orifice fitting and the improved seal ring of the present invention;

FIG. 2 is a sectional view of a portion of an orifice fitting showing the prior art seal ring, orifice plate, carrier plate and adjusting screws;

FIG. 3 is a sectional view taken along line 3—3 of FIG. 2;

DETAILED DESCRIPTION OF THE INVENTION

Figure 4:
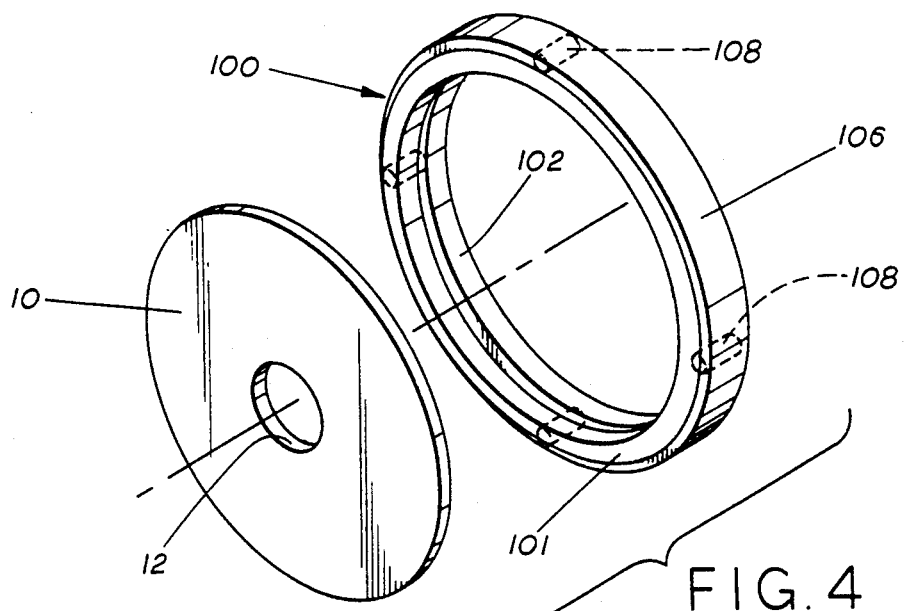
FIG. 4 is an exploded view of the improved seal ring of the present invention and the orifice plate.
Figure 5:
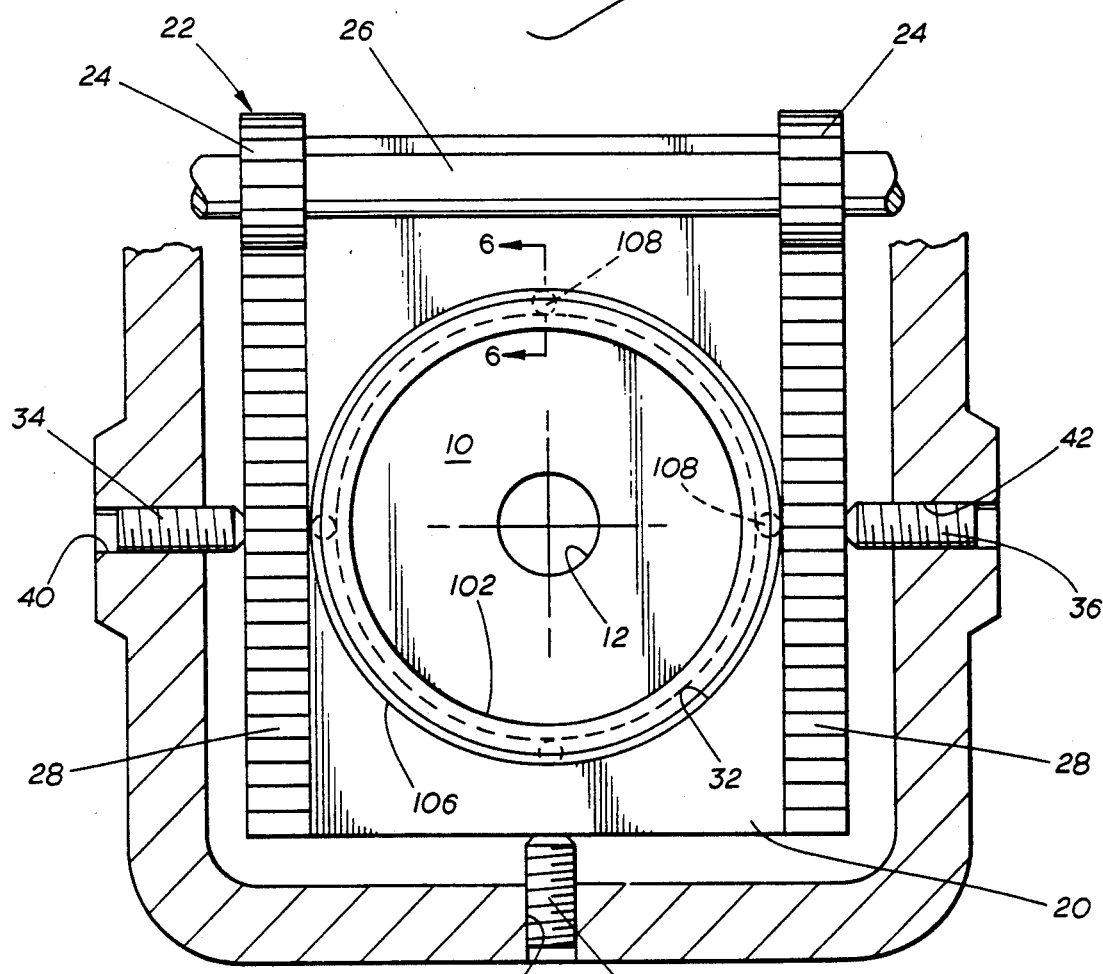
FIG. 5 is a sectional view taken along line 5—5 of FIG. 1.

Referring now to FIG. 1, the letter F generally represents a typical orifice fitting having a longitudinal bore 16 extending therethrough. The orifice fitting F includes a carrier plate slot 18 oriented transversely to the longitudinal bore 16 for receiving a carrier plate 20. The carrier plate 20 is raised and lowered into the longitudinal bore 16 with a gear assembly designated generally as 22 as shown in FIGS. 2 and 5. The gear assembly 22 includes a pair of gears 24 mounted on a shaft 26. The carrier plate 20 includes two rows of teeth 28 which mesh with the gears 24 when inserted in the carrier plate slot 18. A handle (not shown) connected to an end of the shaft 26 is rotated to raise and lower the carrier plate 20.

As shown in FIGS. 1, 2, and 5, the carrier plate 20 includes a circular bore 32 having a diameter greater than the diameter of the longitudinal bore 16. An orifice plate 10 has an orifice plate bore 12 concentrically located in the orifice plate 10. The orifice plate 10 has a circular outer periphery having a diameter which is greater than the inside diameter of the longitudinal bore 16 but less than the diameter of the circular bore 32 of the carrier plate 20. The outer periphery of the orifice plate 10 is received by a seal ring.

To differentiate between the prior art seal ring as shown in FIGS. 2 and 3 and the improved seal ring of the present invention, the prior art seal ring is referred to as reference numeral 100' and the improved seal ring of the present invention as reference numeral 100.

Referring to FIGS. 2 and 3, the seal ring 100' and the orifice plate 10 are inserted in the bore 32 of the carrier plate 20. The orifice plate 10 is held in an annular recessed groove 104 of the seal ring 100'. The seal ring 100' forms a seal with the orifice plate 10 and with the walls of the carrier plate slot 18 to ensure that the fluid flow passes through the bore 12 of the orifice plate 10.

Referring to FIGS. 1, 2, and 5, the typical orifice fitting F includes side adjusting screws 34 and 36 and a vertical adjusting screw 38 which threadably engage threaded holes 40, 42, and 44, respectively, in the orifice fitting F. The adjusting screws 34, 36, and 38 are adjusted to concentrically align the bore 12 of the orifice plate 10 in the longitudinal bore 16 of the orifice fitting F. Aligning the orifice plate bore 12 concentrically or within the allowable eccentricity is performed during manufacture or repair of the orifice fitting F at which time the orifice plate 10 and the seal ring 100' are not subjected to operating conditions.

Figures 6, 7:
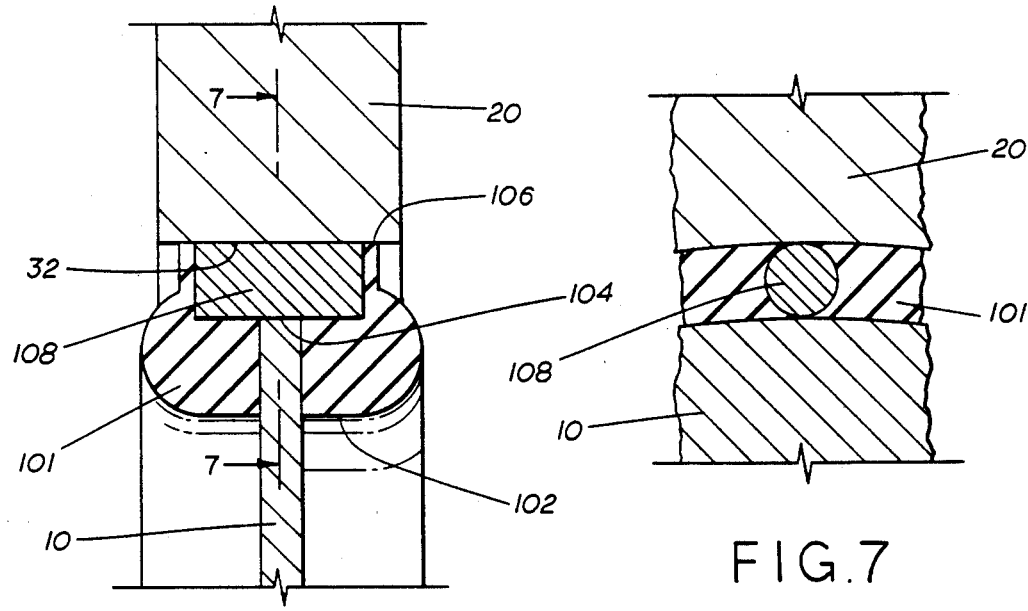
FIG. 6 is a sectional view taken along line 6—6 of FIG. 5.
FIG. 7 is a sectional view taken along line 7—7 of FIG. 6.

As shown in FIGS. 3 and 6, the seal rings 100 and 100' each have a body 101 including an inner periphery 102 containing the annular recessed groove 104 for receiving the orifice plate 10. The seal rings 100 and 100' have an outer periphery 106 which engages the periphery of the circular bore 32 of the carrier plate 20.

Referring to FIG. 2, the solid line showing of the orifice plate bore 12 illustrates the concentrically aligned orifice plate 10 which has been concentrically aligned with the longitudinal bore 16 of the orifice fitting F while not subjected to anticipated temperature and pressure operating conditions. The dashed lines in FIG. 2 illustrate the bore 12' of the orifice plate 10 which is not concentrically aligned by an eccentricity $\Sigma$ with the longitudinal bore 16 when subjected to operating temperatures and pressures. FIG. 3 shows in dashed lines the radial movement of the orifice plate 10 with respect to the seal ring 100'during operating conditions whereas the solid line shows the position of the orifice plate 10 when not subjected to operating conditions.

Referring to FIGS. 2 and 3, the prior art seal ring 100' allows the orifice plate 10 to reposition itself under operating conditions due to the pliancy of the seal ring 100' and the high temperatures and pressures being experienced by the seal ring 100' and the orifice plate 10. Thus, even though the orifice plate 10, seal ring 100', and the carrier plate 20 can be properly positioned concentrically or within the allowable eccentricity in the longitudinal bore 16 of the orifice fitting F during manufacture and repair of the orifice fitting F, the orifice plate bore 12 may exceed the allowable eccentricity during operating conditions. Misalignment of the orifice plate bore 12 increases the error in the determination of the flow measurement of the fluid flowing in the pipe.

Figures 8, 9:
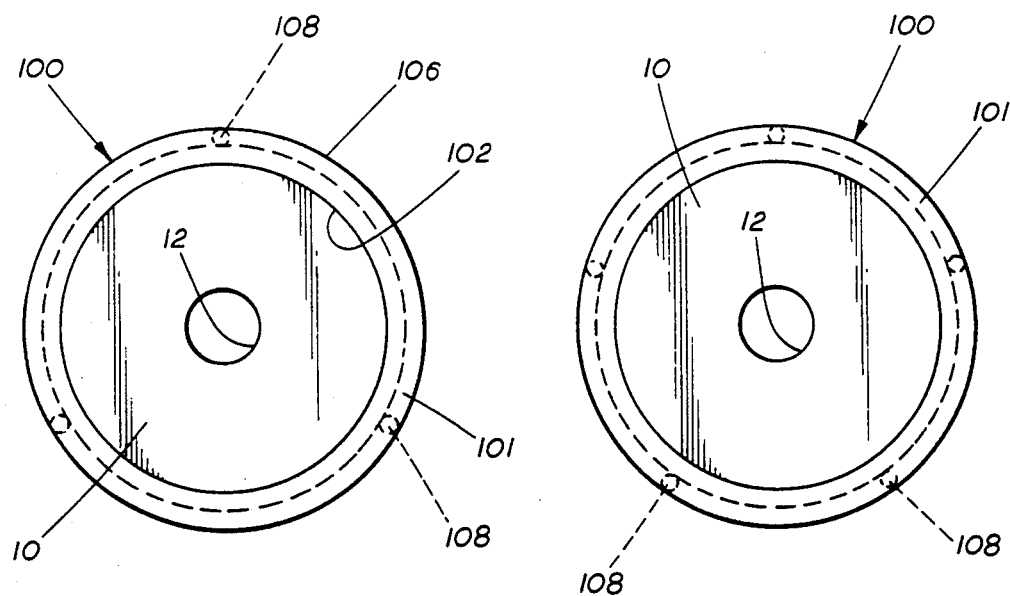
FIGS. 8 and 9 illustrate various embodiments of the improved seal ring of the present invention.

The seal ring 100 of the present invention as shown in FIGS. 4 through 9 substantially eliminates the repositioning of the orifice plate 10 which occurs under operating conditions. The seal ring 100 includes a plurality of pins 108 positioned in the body 101 in a direction parallel to the bore 16 of the orifice fitting F. As shown in FIGS. 5, 7, 8, and 9, the pins 108 preferably have a round cross section and a diameter substantially equal to the distance between the outer periphery 106 and the annular recessed groove 104 of the seal ring 100 as best shown in FIG. 6. The diameter of the pin 108 is typically 0.164 inches having a length of approximately 0.375 inches. The pins 108 are preferably positioned in the seal ring 100 during the molding of the body 101. Preferably, the pins 108 are positioned in the body 101 so that each pin 108 is substantially tangent with the outer periphery 106 of the seal ring 100 and also substantially tangent with the annular recessed groove 104. The pins 108 are circumferentially spaced a uniform distance from one another. The number of pins 108 required is a minimum of three as shown in FIG. 8, but it is to be understood that as many pins 108 as desired may be included. For example, FIGS. 5 and 9 show the seal ring 100 with four and five pins 108, respectively.

The diameter and placement of the pins 108 is such that the outer periphery of the orifice plate 10 is in contact with the circumferentially spaced pins 108 which are in contact with the periphery of the circular bore 32 of the carrier plate 20. Thus, the orifice plate 10 is in metal to metal contact with the carrier plate 20 to provide exact metal to metal alignment and maintain concentricity of the orifice plate bore 12 under operating conditions, thus ensuring that the orifice plate bore 12 meets the tight industry tolerances as indicated below even under operating conditions.

The seal ring 100 with the plurality of pins 108 will have an outer diameter approximating the diameter of the circular bore 32 of the carrier plate 20. Preferably, the diameter of the seal ring 100 will not be more than 0.001 inches less than the diameter of the circular bore 32 of the carrier plate 20. The seal ring 100 with the orifice plate 10 is firmly received by the circular bore 32 of the carrier plate 20.

For illustration purposes, the maximum allowable orifice plate bore eccentricity $\Sigma$ for various sizes of pipes and values (orifice plate bore diameter to orifice fitting bore diameter ratio) according to current API standards are presented below:

| $\beta$ | Tube Inside Diameter (inches) | | | | |
|---|---|---|---|---|---|
| | 2.067 | 3.068 | 4.026 | 6.065 | 7.981 |
| 0.65 | 0.010* | 0.015* | 0.020 | 0.030 | 0.039 |
| 0.70 | 0.008* | 0.012* | 0.015* | 0.023 | 0.030 |
| 0.75 | 0.006* | 0.009* | 0.012* | 0.018* | 0.024 |

(*May be increased to 0.020 with an added uncertainty of up to 0.5%)

The improved seal ring 100 will limit the radial movement of the orifice plate 10 under operating conditions to a maximum of one-half of 0.001 inches or 0.0005 inches. This represents a significant improvement over the prior art seal ring 100' which allows radial movement of the orifice plate 10 under operating conditions typically in the range of 0.005 to 0.015 inches.

Another advantage of the improved seal ring 100 is that the above listed eccentricities are attainable with existing orifice fittings F which were not manufactured under the exacting standards as listed above. In other words, the only modification required to upgrade existing orifice fittings F is to replace the old seal ring 100' with a seal ring 100 according to the present invention while using the existing orifice plate 10 and carrier plate 20. This provides substantial savings to the operator and can be easily installed in the field.

The foregoing disclosure and description of the invention is illustrative and explanatory thereof, and various changes in the size, shape, and materials, as well as in the details of illustrative construction and assembly, may be made without departing from the spirit of the invention.

I claim:

1. A seal ring for maintaining the radial position of a first plate in a second plate having a circular bore extending therethrough, the seal ring comprising:
   a flexible, pliant body having an inner periphery containing an annular recessed groove for receiving and sealingly engaging the first plate, and said body having an outer periphery which is received by the circular bore of the second plate; and
   a plurality of circumferentially spaced pins positioned in said body in a direction perpendicular to the first plate, wherein each said pin is substantially in direct contact with the first plate and the second plate for maintaining the radial position of the first plate in the second plate.

2. The seal ring according to claim 1, wherein each said pin is substantially tangent with said outer periphery of said body.

3. The seal ring according to claim 2, wherein each said pin is substantially tangent with said annular recessed groove of said body.

4. The seal ring according to claim 1, wherein each said pin has a length greater than the thickness of the first plate.

5. The seal ring according to claim 4, wherein each said pin contacts the entire thickness of the first plate and the entire length of each said pin contacts the second plate.

6. A seal ring for maintaining the radial position of an orifice plate in a carrier plate having a circular bore extending therethrough, the seal ring comprising:
   a flexible, pliant body having an inner periphery containing an annular recessed groove for receiving and sealingly engaging the outer periphery of the orifice plate, and said body having an outer periphery which is received by the circular bore of the carrier plate;
   a plurality of circumferentially spaced, cylindrical pins molded in said body in a direction perpendicular to the orifice plate, each said pin having a length greater than the thickness of the orifice plate and substantially tangential to said outer periphery of said body and substantially tangential to said annular recessed groove.

7. The seal ring according to claim 6, wherein each said pin contacts the entire thickness of the orifice plate and the entire length of each said pin contacts the carrier plate.

* * * * *